G. B. DUNHAM,

Assignor to J. G. BUZZELL & Co.

Buffing Mandrel.

No. 8,555. Reissued Jan. 28, 1879.

*Witnesses:*

Franklin Ashley Jr.

Charles S Brown

*Inventor:*

George B. Dunham.

UNITED STATES PATENT OFFICE.

GEORGE B. DUNHAM, OF PHILADELPHIA, PENNSYLVANIA, ASSIGNOR TO JOHN G. BUZZELL & CO., OF LYNN, MASSACHUSETTS.

IMPROVEMENT IN BUFFING-MANDRELS.

Specification forming part of Letters Patent No. 137,187, dated March 25, 1873; Reissue No. 8,555, dated January 28, 1879; application filed July 31, 1878.

*To all whom it may concern:*

Be it known that I, GEORGE B. DUNHAM, formerly of Lynn, in the county of Essex, and in the State of Massachusetts, now of Philadelphia, in the State of Pennsylvania, have invented certain new and useful Improvements in Buffer-Rolls; and do hereby declare that the following is a full, clear, and exact description thereof, reference being had to the drawings filed with the original application, and making a part of this specification, in which—

Figure 1:
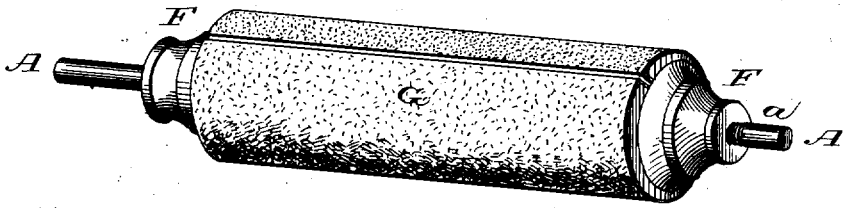
Figure 2:
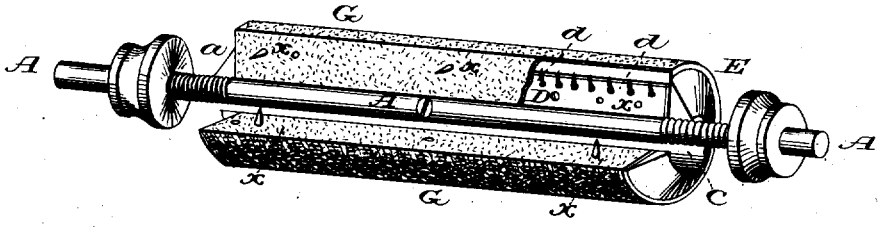
Figure 3:
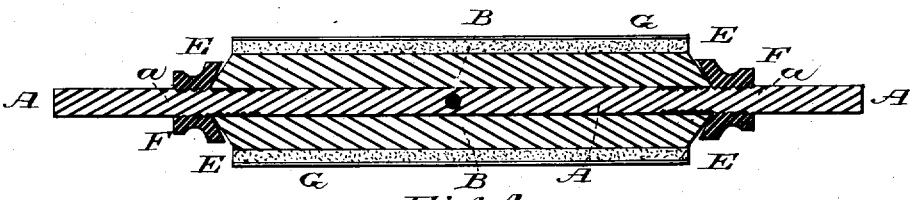
Figure 4:
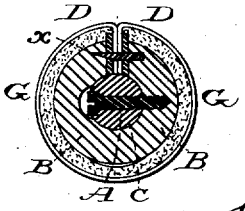

Figure 1 is a perspective view of my improved device as ready for use. Fig. 2 is a like view of the same with the roller-sections disengaged and opened out. Fig. 3 is a central longitudinal section of said device, and Fig. 4 is a central cross-section of the same.

Letters of like name and kind refer to like parts in each of the figures.

The object of my invention is to enable the abrasive covering to be easily and quickly placed upon or removed from the roller; and it consists, principally, in a buffer-roller divided centrally and longitudinally, and its sections connected with each other and with the shaft, substantially as and for the purposes hereinafter specified.

It consists, further, in the means employed for attaching the felt to or upon the periphery of the roller, substantially as and for the purposes hereinafter set forth.

It consists, finally, in the device as a whole, when its parts are constructed and combined substantially as and for the purposes hereinafter specified.

In the annexed drawings, A represents a shaft, having upon and around its periphery a wooden roller, B, which is constructed in two sections that unite upon a central longitudinal line. One of the sections is permanently attached to the roller, while said sections are connected together by means of a strip of suitable elastic material, C, that extends along their entire length at one side, and forms a flexible hinge for and upon which the movable section swings. Attached to the divided edge of each section, opposite to the hinge C, is a strip of sheet metal, D, which extends radially outward to a short distance beyond the periphery of the roller, and is provided along its outer edge with a series of perforations, *d*. Encircling the roller B, and extending between the metal flanges D, is a covering of felt or other suitable elastic material, E, the edges of which are connected with said flanges by means of a thread which is passed through said felt and through the openings *d*, as shown.

The ends of the roller B are made conical, and over or against each, and over a threaded portion, *a*, of the shaft A, is fitted a nut, F, the inner face of which is concave, and corresponds to the shape of said roller end.

As thus constructed, it will be seen that by screwing inward upon the nuts their conical faces will operate as inclined planes, and force the roller-sections inward against the shaft A, making the roller practically solid, while by turning said nuts outward said sections are released and the movable one permitted to swing outward. The abrasive covering G is placed around the periphery of the roller, with its edges extending inward along the edges of the sections, to which latter said covering is attached by means of two or more studs or pins, X, that project outward from each of the same, and fit into corresponding openings formed in the edge of the opposite section.

When it is desired to replace the covering, the nuts are turned outward, so as to release the movable roller-section, the latter opened away from the shaft, and the edges of said covering removed, after which a new covering can be applied and the parts replaced, the entire operation requiring but a few moments of time.

The advantages afforded by this construction are the security with which the elastic and abrasive coverings are held in position upon the roller, and the ease with which they can be placed upon or removed from the same.

By practical experience in the use of my invention it has been found that the flanges D, extending radially outward to a short distance beyond the periphery of the roller, as hereinbefore described, serve another and even more important purpose than the one given in my original specification. When the abrasive covering is carried around and over the edge of one flange, then drawn tightly over the periphery of the roller and over the edge of the other flange, and the roller is then closed and fastened, it is found that a perfect joint is formed between the surfaces of the abrasive covering at their point of contact at the opening in the roller.

The effect produced by this peculiar arrangement of the flanges is of very great importance. The roller when in operation is made to revolve rapidly, and it is obvious that any inequality in the surface of the roller would produce ridges upon the sole of the boot or shoe subjected to the operation, and otherwise mar its finish.

By the use of my flanges, arranged as described, the surface of the abrasive covering of the roller is rendered smooth and nearly or quite cylindrical, so that a perfect finish to the sole of a boot or shoe is secured.

Having thus fully set forth the nature and merits of my invention, what I claim as new is—

1. The metal flanges D, constructed substantially as described, in combination with a sectional buffing-mandrel, arranged substantially as described, and for the purposes set forth.

2. In combination with the divided roller B and felt covering E, the metal flanges D, attached to said roller, and provided with the perforations *d*, substantially as and for the purpose set forth.

3. In combination with the divided roller B, provided with conical ends, the nuts F, made concave upon their inner faces, and fitted upon the threaded portions *a* of the shaft A, substantially as and for the purpose shown.

4. The shaft A, provided with the threaded portions *a*, the divided roller B, having conical ends and covered with felt E and abrasive material G, and the nuts F, having conical inner faces, when said parts are constructed and combined substantially as and for the purposes specified.

In testimony that I claim the foregoing I have hereunto set my hand this 25th day of July, 1878.

GEORGE B. DUNHAM.

Witnesses:

E. H. BAILEY,

L. E. ENSIGN.